3,426,048
(OPTIONALLY 17-ALKYLATED) 17-OXYGENATED-
7-METHYL-5α-ANDROST-2-ENES
Paul D. Klimstra, Northbrook, Ill., assignor to G. D.
Searle & Co., Chicago, Ill., a corporation of Delaware
No Drawing. Filed Sept. 23, 1966, Ser. No. 581,462
U.S. Cl. 260—397.3                11 Claims
Int. Cl. C07c 169/22, 169/20

The present invention is concerned with novel steroidal derivatives of the androstane family and especially with (optionally 17 - alkylated) 17 - oxygenated-7-methyl-5α-androst-2-enes as represented by the following structural formulas

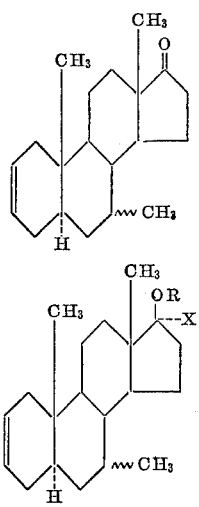

wherein R is hydrogen or a lower alkanoyl radical, X is hydrogen or a lower alkyl radical and the wavy line signifies the optional α or β stereochemical configuration of the 7-methyl substituent.

The lower alkyl radicals encompassed by the X term in the foregoing structural representation are typified by methyl, ethyl, propyl, butyl, pentyl, hexyl, heptyl and the branched-chain radicals isomeric therewith.

Illustrative of the lower alkanoyl radicals symbolized by the R term are formyl, acetyl, propionyl, butyryl, valeryl, caproyl, heptanoly and the corresponding branched-chain isomeric groups.

The compounds of the present invention display valuable pharmacological properties. They are hormonal and anti-hormonal agents, for example, as is evidenced by their anabolic, androgenic and anti-estrogenic properties. They are, moreover, lacking in the pepsin-inhibitory and dicotyledonous seed germination inhibitory side-effects characteristic of prior art substances adapted for those purposes.

Manufacture of the instant compounds is conveniently effected by processes which utilize as starting materials, compounds of the following structural formula

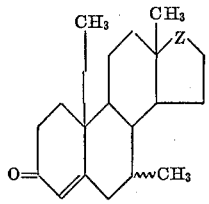

wherein Z represents a carbonyl, β-hydroxymethylene or α-(lower alkyl)-β-hydroxymethylene group and the wavy line, as hereinbefore, denotes the optional 7α or 7β stereochemical configuration. Those starting materials, disclosed by Campbell and Babcock, J. Am. Chem. Soc., 81, 4069 (1959), can be utilized either as the epimeric mixture or as the individual 7α or 7β epimer depending upon the particular final product desired.

The initial step in a process for manufacture of the instant compounds involves conversion of the 3-keto-Δ$^4$ structure of the aforementioned starting materials to a 3β-hydroxy-5α-hydrogen structure. That conversion can be achieved by concurrent reduction of the 3-keto and Δ$^4$ moieties or, alternatively, by successive reduction of those groups. Media suitable for concurrent reduction are alkali metal-liquid ammonia combinations wherein the alkali metal can be sodium, potassium or lithium. As an example of that procedure, 17β-hydroxy-7-methyl-androst-4-en-3-one 17-tetrahydropyran-2-yl ether, prepared by the reaction of 17β-hydroxy-7-methylandrost-4-en-3-one with dihydropyran in the presence of p-toluene-sulfonic acid, is contacted with lithium metal and liquid amonia containing tetrahydrofuran, thus producing 7-methyl-5α-androstane-3β,17β - diol 17 - tetra-hydropyran-2-yl ether.

The 3-keto group of the instant starting materials is preferentially reduced by means of a metallic hydride reagent such as lithium aluminum hydride, sodium borohydride, lithium tri-(tertiary-butoxy) aluminum hydride or diisobutyl aluminum hydride. The Δ$^4$ double bond is then reduced by catalytic hydrogenation, utilizing catalysts such as platinum, palladium, ruthenium, strontium or zirconium. A specific example of that process is the reaction of 17β-hydroxy-7,17α-dimethylandrost-4-en-3-one with lithium tri-(tertiary-butoxy) aluminum hydride to afford 7,17α-dimethylandrost-4-ene-3β,17β-diol, which is contacted with platinum oxide catalyst in a hydrogen atmosphere at room temperature and atmospheric pressure to yield 7,17α-dimethyl-5α-androstane-3β,17β-diol.

Selective reduction of the Δ$^4$ double bond is preferably achieved by the utilization of catalytic hydrogenation involving a palladium catalyst. 17β-hydroxy-7,17α-dimethyl-androst-4-en-3-one is thus hydrogenated with 5% palladium-on-carbon catalyst at atmospheric pressure and room temperature to afford 17β-hydroxy-7,17α-dimethyl-5α-androstan-3-one. Reduction of the 3-keto group is then effected by means of the metallic hydride reagents described hereinbefore. Lithium tri-(tertiary-butoxy) aluminum hydride in tetrahydrofuran thus converts 17β-hydroxy-7,17α-dimethyl-5α-androstan-3-one to the desired 7,17α-dimethyl-5α-androstane-3β,17β-diol.

The aforementioned 3β-hydroxy-5α-hydrogen intermediates are converted to the corresponding Δ$^2$-5α-hydrogen compounds of the present invention by a two-step process involving acylation of the 3-hydroxy group to form a readily pyrolyzed ester, followed by pyrolysis of that ester. Sulfonate esters such as the p-toluenesulfonate, benzenesulfonate, and methanesulfonate are particularly preferred. Pyrolysis is conveniently accomplished by heating with a high-boiling organic amine. That two-step process is specifically illustrated by the reaction of 7,17α-dimethyl-5α-androstane-3β,17β-diol with p-toluenesulfonyl chloride in pyridine followed by heating of the resulting 3-p-toluenesulfonate in collidine solution. The resulting crude Δ$^2$ compound is purified by conversion to the corresponding 3α-bromo-2β-hydroxy compound, suitably by reaction with with N-bromosuccinimide in aqueous perchloric acid, followed by reaction with zinc metal to regenerate the Δ$^2$ double bond. In that manner, the latter 3-p-toluenesulfonate, for example, is converted to 7,17α-dimethyl-5α-androst-2-en-17β-ol.

The instant compounds which possess a secondary 17-hydroxy group are alternatively obtained by reduction of the corresponding 17-keto compounds. 7-methyl-5α-androst-2-en-17-one, for example, is contacted with sodium borohydride to afford 7-methyl-5α-androst-2-en-17β-ol.

Oxidation of the instant compounds characterized by a secondary 17-hydroxy group, typically with hexavalent chromium, affords the corresponding 17-keto substances. The aforementioned 7-methyl-5α-androst-2-en-17β-ol is thus contacted with chromic acid in acetone to yield 7-methyl-5α-androst-2-en-17-one.

Another alternate route to the instant 17-keto compounds involves selective formation of the 17-cyanohydrin of a 7-methylandrost-4-ene-3,17-dione followed by acylation of the resulting 17-hydroxy group, reduction of the 3-keto group, alkaline cleavage of the acylated cyanohydrin to regenerate the 17-keto group and conversion of the 3β-hydroxy to the corresponding Δ² structure by the procedures described hereinbefore. A specific example of those processes is the reaction of 7-methylandrost-4-ene-3,17-dione with acetone cyanohydrin in the presence of a catalytic quantity of triethylamine to afford 17-cyano-17-hydroxy-7-methylandrost-4-en-3-one, acylation of that substance with acetic anhydride in pyridine to afford the corresponding 17-acetate, reduction of the 3-keto group by means of lithium tri-(tertiary-butoxy) aluminum hydride to afford 17-cyano-7-methylandrost-4-ene-3β,17β-diol 17-acetate, cleavage of the acylated cyanohydrin function with aqueous potassium hydroxide in methanol to afford 3β-hydroxy-7-methylandrost-4-en-17-one followed by reduction of the Δ⁴ double bond, conversion to the 3β-p-toluenesulfonate, and pyrolysis of that ester by the processes described hereinbefore, thus producing 7-methyl-5α-androst-2-en-17-one.

The addition of an alkyl organometallic reagent to the instant 17-keto derivatives provides an alternate route to the 17-alkyl-17-hydroxy compounds of this invention. The reaction of 7-methyl-5α-androst-2-en-17-one with methyl magnesium bromide followed by decomposition of the resulting Grignard adduct thus affords 7,17α-dimethyl-5α-androst-2-en-17β-ol.

Reaction of the instant 17-hydroxy compounds with a lower alkanoic acid anhydride or halide, preferably in the presence of a suitable acid acceptor, results in the corresponding 17-(lower alkanoates). When the 17-hydroxy group is secondary, the conversion is conveniently effected at room temperature, whereas higher temperatures are required for esterification of the tertiary 17-hydroxy group. The preparation of 7-methyl-5α-androst-2-en-17β-ol 17-acetate is thus effected by contacting the parent 17β-ol with acetic anhydride and pyridine at room temperature, while the preparation of 7,17α-dimethyl-5α-androst-2-en-17β-ol 17-acetate requires heating of the parent 17β-ol with those reagents.

The invention will appear more fully from the examples which follow. These examples are set forth by way of illustration only, and it will be understood that the invention is not to be construed as limited either in spirit or in scope by the details contained therein as many modifications both in materials and methods will be apparent from this disclosure to those skilled in the art. In these examples, temperatures are given in degrees centigrade (° C.) and quantities of materials in parts by weight unless otherwise noted.

Example 1

A solution of 1 part of 17β-hydroxy-7,17α-dimethylandrost-4-en-3-one in 67.5 parts of tetrahydrofuran is cooled to 0-5° by means of an ice bath, at which time 3 parts of lithium tri-(tertiary-butoxy) aluminum hydride is added. That mixture is stirred for about 1½ hours, then is quenched by pouring into an ice-water mixture containing excess acetic acid. The precipitate which forms is collected by filtration, washed with water, dried in air, then purified by recrystallization from aqueous methanol to yield 7,17α-dimethlandrost-4-ene-3β,17β-diol, melting at about 161–163° and exhibiting an optical rotation, in chloroform, of +14°.

To a solution of 1.6 parts of 7,17α-dimethylandrost-4-ene-3β,17β-diol in 40 parts of ethanol is added 0.1 part of platinum oxide catalyst, and that mixture is stirred with hydrogen at atmospheric pressure and room temperature until 1 molecular equivalent of hydrogen is absorbed. Removal of the catalyst by filtration followed by distillation of the resulting filtrate to dryness affords the crude product. Recrystallization of that material from aqueous methanol affords pure 7,17α-dimethyl-5α-androstane-3β,17β-diol, melting at about 211–212.5°.

To a solution of 8.3 parts of 7,17α-dimethyl-5α-androstane-3β,17β-diol in 60 parts of pyridine is added 8.3 parts of p-toluenesulfonyl chloride, during which time the temperature of the mixture is kept at about 25° by means of external cooling. The reaction mixture is then kept at room temperature for about 16 hours, following which reaction time it is poured into a mixture of ice and dilute hydrochloric acid. The precipitate which forms is collected by filtration, washed with water and dried in air to yield 7,17α-dimethyl-5α-androstane-3β,17β-diol 3-p-toluenesulfonate, characterized by infrared absorption maxima in chloroform at about 2.75, 3.40, 6.24 and 8.50 microns.

Example 2

To a solution of 3 parts of 17β-hydroxy-7-methylandrost-4-en-3-one in 33.5 parts of methylene chloride is added successively 0.01 part of p-toluenesulfonic acid monohydrate and 3.3 parts of dihydropyran. The resulting reaction mixture is stored at room temperature for about 48 hours, then is washed with water, dried over anhydrous sodium sulfate containing decolorizing carbon and stripped of solvent by distillation under reduced pressure. The resulting dark oily residue is purified by chromatography on basic alumina followed by elution with benzene. Recrystallization of the eluted material from aqueous methanol affords 17β-hydroxy-7-methylandrost-4-en-3-one 17-tetrahydropyran-2-yl ether, melting at about 110–112°. This compound exhibits an ultraviolet absorption maximum at about 242 millimicrons with a molecular extinction coefficient of about 15,600.

To a mixture of 560 parts of liquid ammonia with 360 parts of tetrahydrofuran is added, with stirring and cooling at about −70°, a solution of 50 parts of 17β-hydroxy-7-methylandrost-4-en-3-one 17-tetrahydropyran-2-yl ether in 225 parts of tetrahydrofuran. There is then added portionwise 8 parts of lithium wire. The excess reagent, as indicated by the blue color of the reaction mixture, is decomposed by the addition of a small quantity of methanol. The ammonia is then removed by evaporation, and the resulting mixture is carefully poured into ice and water. The aqueous mixture which results is extracted with ether, and the ether solution is separated, then washed with water, dried over anhydrous sodium sulfate containing decolorizing carbon and distilled to dryness under reduced pressure, thus affording 7-methyl-5α-androstane-3β,17β-diol 17-tetrahydropyran-2-yl ether as an oil. Infrared absorption peaks are observed, in choloroform, at about 2.75, 3.40, 8.80, 9.32 and 9.68 microns.

A solution containing 5 parts of 7-methyl-5α-androstane-3-β,17β-diol 17-tetrahydropyran-2-yl ether, 6 parts of p-toluenesulfonyl chloride and 15 parts of pyridine is allowed to stand at room temperature for about 16 hours, then is poured into a mixture of ice and water. The resulting aqueous mixture is extracted with ether, and the ether layer is separated, then washed successively with dilute hydrochloric acid and water. Drying over anhydrous sodium sulfate containing decolorizing carbon followed by distillation of the solvent under reduced pressure affords 7-methyl-5α-androstane-3β,17β-diol 17-tetrahydropyran-2-yl ether, 3-p-toluenesulfonate as an oil.

Example 3

A solution containing approximately 7 parts of 7-methyl - 5α - androstane-3β,17β-diol 17-tetrahydropyran-2-yl ether, 3-p-toluenesulfonate in 64 parts of collidine is heated at the reflux temperature for about 4 hours, then is cooled and poured into a mixture of ice and water containing 55.2 parts of concentrated sulfuric acid. The acidic mixture is extracted with ether, and the ether layer is separated, washed successively with water and 5% aqueous sodium bicarbonate, then dried over anhydrous sodium sulfate containing decolorizing carbon and stripped of solvent by distillation under reduced pressure to afford crude 7-methyl-5α-androst-2-en-17β-ol as an oil.

The latter oily material, amounting to approximately 3.3 parts, is dissolved in 75 parts of dioxane, and a slurry containing 2.7 parts of N-bromosuccinimide, 1.5 parts of 60% aqueous perchloric acid and 30 parts of water is added dropwise with stirring over a period of about 10 minutes. Stirring is continued for about 2 hours, after which time the mixture is poured into water and extracted with ether. The ether layer is separated, then washed with water and dried over anhydrous sodium sulfate. Removal of the solvent by distillation under reduced pressure affords a glass-like residue, which is purified by chromatography on silica gel followed by elution with 5% ethyl acetate in benzene, thus affording 3α-bromo-2β-hydroxy-7-methyl-5α-androst-2-en-17-one.

To a solution of 1.6 parts of 3α-bromo-2β-hydroxy-7-methyl-5α-androst-2-en-17-one in 52.5 parts of glacial acetic acid is added 5 parts of zinc dust, and the resulting mixture is heated at the reflux temperature for about 15 minutes, then is cooled and filtered in order to remove the metallic zinc. The resulting filtrate is diluted with water, then cooled in order to induce crystallization of the product. Recrystallization of that crude material from methanol affords platelet-like crystals of pure 7-methyl-5α-androst-2-en-17-one, melting at about 138–141° and displaying an optical rotation of +120° in chloroform. This compound is represented by the following structural formula

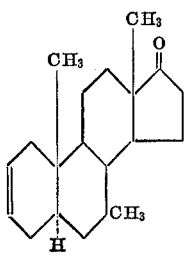

Example 4

A solution containing 15 parts of 7,17α-dimethyl-5α-androstan-17-ol 3-p-toluenesulfonate in 368 parts of collidine is heated at the reflux temperature for approximately 4 hours, then is poured into a mixture of ice and water containing 156 parts of concentrated sulfuric acid. The precipitate which forms is collected by filtration, washed on the filter with water, dried in air, then dissolved in 50 parts of dioxane. To the latter solution is added, over a period of about 10 minutes, a slurry consisting of 1.8 parts of N-bromosuccinimide, 1 part of 60% aqueous perchloric acid and 20 parts of water. After stirring for approximately 3 hours, the reaction mixture is poured into a mixture of ice and water. The crude product which precipitates is collected by filtration, dried in air, then purified by chromatography on silica gel followed by elution with 10% ethyl acetate in benzene. The 3α-bromo-7,17α-dimethyl-5α-androstane-2β,17β-diol thus produced is dissolved in 26 parts of glacial acetic acid, and 2.2 parts of zinc dust is added. After heating at the reflux temperature for about 15 minutes, the zinc metal is removed by filtration, and the filtrate is diluted with water. The resulting gel-like solid is isolated by filtration, washed on the filter with water and dried in air to afford 7,17α-dimethyl-5α-androst-2-en-17β-ol hemihydrate, melting at about 142–144°. This compound is represented by the following structural formula

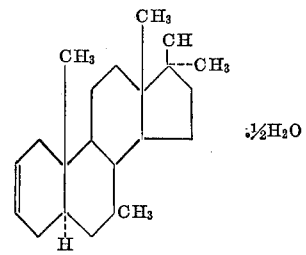

Example 5

To a solution of 4.5 parts of 7-methyl-5α-androst-2-en-17-one in 120 parts of isopropyl alcohol containing 12 parts of methanol is added a solution of 5 parts of sodium borohydride in 6 parts of water, and that reaction mixture is stirred at room temperature for about 2 hours. The crude product is precipitated by the addition of water and acetic acid, then is collected by filtration, washed on the filter with water and dried in air. Recrystallization of that material from aqueous methanol affords pure 7-methyl-5α-androst-2-en-17β-ol, melting at about 133–135°. This compound is characterized by an optical rotation, in chloroform, of +39° and also by the following structural formula

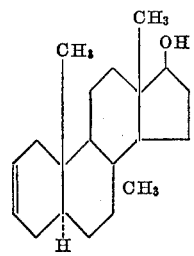

Example 6

When an equivalent quantity of 17β-hydroxy-7α,17α-dimethylandrost-4-en-3-one or 17β-hydroxy-7β,17α-dimethylandrost-4-en-3-one is subjected to the successive processes of Examples 1 and 4, there are produced 7α,17α-dimethyl-5α-androst-2-en-17β-ol and 7β,17α-dimethyl-5α-androst-2-en-17β-ol, respectively.

Example 7

When an equivalent quantity of 17β-hydroxy-7α-methylandrost-4-en-3-one or 17β-hydroxy-7β-methylandrost-4-en-3-one is subjected to the successive processes of Examples 2 and 3, there are produced 7α-methyl-5α-androst-2-en-17-one and 7β-methyl-5α-androst-2-en-17-one, respectively.

Example 8

The reduction of an equivalent quantity of 7α-methyl-5α-androst-2-en-17-one or 7β-methyl-5α-androst-2-en-17-one by the procedure described in Example 5 result in 7α-methyl-5α-androst-2-en-17β-ol and 7β-methyl-5α-androst-2-en-17β-ol, respectively.

Example 9

By substituting an equivalent quantity of 17α-ethyl-17β-hydroxy-7-methylandrost-4-en-3-one and otherwise proceeding according to the successive processes of Examples 1 and 4, there is produced 17α-ethyl-7-methyl-5α-androst-2-en-17β-ol.

Example 10

A mixture containing 1 part of 7-methyl-5α-androst-2-en-17β-ol, 10 parts of acetic anhydride and 20 parts of pyridine is allowed to stand at room temperature for about 16 hours, then is poured carefully into a large quantity of water. Extraction of that aqueous mixture with benzene affords an organic solution, which is dried over anhydrous sodium sulfate and concentrated to dryness under reduced pressure to afford 7-methyl-5α-androst-2-en-17β-ol 17-acetate.

Example 11

When an equivalent quantity of 7,17α-dimethyl-5α-androst-2-en-17β-ol is contacted with acetic anhydride and pyridine at 90–100° for about 12 hours according to the procedure described in Example 10, there is produced 7,17α-dimethyl-5α-androst-2-en-17β-ol 17-acetate.

Example 12

The substitution of an equivalent quantity of propionic anhydride in the procedure of Example 10 results in 7-methyl-5α-androst-2-en-17β-ol 17-propionate.

What is claimed is:

1. A member selected from the group consisting of compounds of the formulas

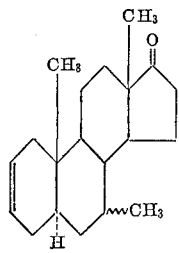

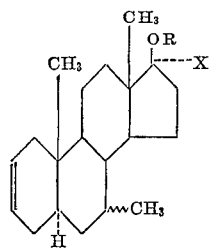

wherein R is selected from the group consisting of hydrogen and a lower alkanoyl radical and X is a member of the class consisting of hydrogen and a lower alkyl radical.

2. As in claim 1, a compound of the formula

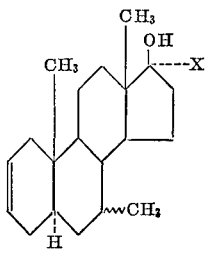

wherein X is a member of the class consisting of hydrogen and a lower alkyl radical.

3. As in claim 1, the compound which is 7,17α-dimethyl-5α-androst-2-en-17β-ol.

4. As in claim 1, the compound which is 7-methyl-5α-androst-2-en-17-one.

5. As in claim 1, the compound which is 7-methyl-5α-androst-2-en-17β-ol.

6. As in claim 1, the compound which is 7α,17α-dimethyl-5α-androst-2-en-17β-ol.

7. As in claim 1, the compound which is 7β,17α-dimethyl-5α-androst-2-en-17β-ol.

8. As in claim 1, the compound which is 7α-methyl-5α-androst-2-en-17-one.

9. As in claim 1, the compound which is 7β-methyl-5α-androst-2-en-17-one.

10. As in claim 1, the compound which is 7α-methyl-5α-androst-2-en-17β-ol.

11. As in claim 1, the compound which is 7β-methyl-5α-androst-2-en-17β-ol.

References Cited

UNITED STATES PATENTS 3,203,966    8/1965    Counsell et al.

HENRY A. FRENCH, *Primary Examiner.*

U.S. Cl. X.R.

260—397.4, 397.5, 239.55; 71—77; 260—999